United States Patent
Short

(10) Patent No.: US 8,494,910 B2
(45) Date of Patent: Jul. 23, 2013

(54) METHOD, SYSTEM AND PROGRAM PRODUCT FOR SUPPORTING A TRANSACTION BETWEEN ELECTRONIC DEVICE USERS

(75) Inventor: Thomas K. Short, Whitefish Bay, WI (US)

(73) Assignee: International Business Machines Corporation, Armonk, NY (US)

( * ) Notice: Subject to any disclaimer, the term of this patent is extended or adjusted under 35 U.S.C. 154(b) by 2190 days.

(21) Appl. No.: 10/307,684

(22) Filed: Dec. 2, 2002

(65) Prior Publication Data

US 2004/0107144 A1    Jun. 3, 2004

(51) Int. Cl.
*G06Q 30/00* (2012.01)
*G06F 11/30* (2006.01)

(52) U.S. Cl.
USPC ............................................ 705/26; 713/172

(58) Field of Classification Search
USPC .......................................................... 705/26
See application file for complete search history.

(56) References Cited

U.S. PATENT DOCUMENTS

| | | | |
|---|---|---|---|
| 6,286,099 B1* | 9/2001 | Kramer | 713/172 |
| 6,456,852 B2* | 9/2002 | Bar et al. | 455/456.1 |
| 6,487,660 B1* | 11/2002 | Vanstone et al. | 713/168 |
| 7,385,529 B2* | 6/2008 | Hersh et al. | 340/988 |
| 2001/0053999 A1 | 12/2001 | Feinberg | |
| 2002/0087857 A1* | 7/2002 | Tsao et al. | 713/155 |
| 2002/0143634 A1* | 10/2002 | Kumar et al. | 705/18 |
| 2002/0147658 A1* | 10/2002 | Kwan | 705/26 |
| 2002/0155844 A1 | 10/2002 | Rankin et al. | |
| 2002/0160766 A1 | 10/2002 | Portman et al. | |
| 2003/0009392 A1* | 1/2003 | Perkowski | 705/26 |
| 2003/0154139 A1* | 8/2003 | Woo | 705/26 |
| 2004/0015451 A1* | 1/2004 | Sahota et al. | 705/71 |
| 2004/0068472 A1* | 4/2004 | Sahota et al. | 705/64 |
| 2004/0136379 A1* | 7/2004 | Liao et al. | 370/395.21 |
| 2005/0256766 A1* | 11/2005 | Garcia et al. | 705/14 |

\* cited by examiner

*Primary Examiner* — Garcia Ade
(74) *Attorney, Agent, or Firm* — Matthew Chung; Hoffman Warnick LLC

(57) ABSTRACT

The present invention allows trading partners to be matched with each other based on the proximity of their locations and their capability to complete a desired transaction. Specifically, under the present invention a requestor will issue a transaction request seeking to exchange goods, services and/or information. A trading partner who can fulfill the transaction request will be identified based on a proximity of location of the trading partner to the requestor, as well as the capability of the trading partner to fulfill the transaction.

19 Claims, 3 Drawing Sheets

METHOD, SYSTEM AND PROGRAM PRODUCT FOR SUPPORTING A TRANSACTION BETWEEN ELECTRONIC DEVICE USERS

BACKGROUND OF THE INVENTION

1. Field of the Invention

The present invention generally relates to a method, system and program product for supporting a transaction between electronic device users. Specifically, the present invention allows trading partners to be matched with each other based on a proximity of their respective locations.

2. Background Art

As technology continues to advance, the desire to obtain better ways to exchange goods, services and/or information grows. Specifically, the growing popularity of the Internet has lead to an increased exchange between buyers and sellers over the world wide web. For example, today a consumer can purchase clothing, order meals and obtain weather information all from his/her computer. This convenience has also been aided with the increased popularity of web-capable, wireless devices such as personal digital assistants, mobile telephones, pagers, etc. In an attempt to capitalize on this growing trend, several websites have been deployed that are intended to foster on-line transactions. For example, the on-line auction site EBAY.COM allows computer users to buy and sell goods over the Internet in an auction format.

Unfortunately, no existing system fosters exchanges where co-location of the trading parties is necessary. For example, if seller is attempting to his/her sell tickets to an upcoming sporting event (i.e., in a legal fashion), there is no way to automatically identify ready, willing and able purchasers in close proximity to the seller. Accordingly, many potential trading partners pass like ships in the night.

The failure to automatically match trading partners in close physical proximity to each other is only compounded by the above-described pervasiveness of wireless devices. As known in the art, many wireless devices are network-enabled under the I.E.E.E. 802.11 or Bluetooth standards. In the case of the former, the I.E.E.E. standard 802.11(b) sets forth a specification for a high-frequency wireless local area network (often referred to as Wi-Fi). In the case of the latter, the Bluetooth standard sets forth a specification for wireless devices to communicate on a peer to peer basis. However, given the inherently mobile nature of wireless devices, a device user can access the world wide web in one city (e.g., New York) on one day, and another city the next day (e.g., Las Vegas). However, no existing system allows trading partners to be matched based on their physical locations at a particular point in time. Such a feature could be extremely valuable for several reasons. For example, the wireless device user attempting to sell his/her tickets might not realize that a willing buyer is one block away. Moreover, an employee (e.g., Joe Smith) of a particular company (e.g., IBM) in an airport during a layover, might want to know if there are other employees of the same company also in the airport. Without the capability to identify individuals based on proximity of location, good potential matches might never be made.

In view of the foregoing, there exists a need for a method, system and program product for supporting a transaction between electronic device users. Specifically, a need exists for a location of a requester issuing a transaction request to be determined based on an electronic device (e.g., wireless device, personal computer, etc.) he/she is using. A further need exists for a trading partner to be identified based on the trading partner's capability to fulfill the request, and a proximity of location of the trading partner to the requester.

SUMMARY OF THE INVENTION

In general, the present invention provides a method, system and program product for supporting a transaction between electronic device users. Specifically, a transaction request is generated and transmitted to a transaction node from an electronic device (e.g., personal computer, wireless device, etc.) possessed by a requester. To this extent, the transaction request can be manually generated and sent, or automatically generated and sent. In the case of the latter, the electronic device possessed by the requester can be programmed to actively seek out other electronic devices possessed by potential trading partners within a certain physical proximity. If a potential trading partner is identified, the electronic device could then automatically generate and send the request to the transaction node. In any event, once the transaction request is received by the transaction node, the location of the requestor based on his/her electronic device is determined. The location can be determined by any method now known or later developed. Examples include global positioning system (GPS) technology, triangulation using cellular telephone signals, triangulation using television signals, etc. Once the location is determined, a trading partner will be identified to fulfill the request. The trading partner is identified based on his/her capability (readiness, willingness and ability) to fulfill the transaction request as well as the location of the trading partner. Specifically, a trading partner is selected based on his/her proximity to the location of the requester. Thus, regardless of the location or mobility of the requestor, the present invention identifies a suitable trading partner in physical proximity thereto.

According to a first aspect of the present invention, a computer-implemented method for supporting a transaction between electronic device users is provided. The method comprises: (1) receiving a transaction request from a first electronic device; (2) determining a location of the first electronic device; and (3) identifying a second electronic device for receiving the transaction request based on a proximity of a location of the second electronic device to the location of the first electronic device.

According to a second aspect of the present invention, a computer-implemented method for supporting a transaction between electronic device users is provided. The method comprises: (1) receiving a transaction request from a first electronic device possessed by a requestor; (2) determining a location of the requester based on the electronic device; and (3) identifying a trading partner to fulfill the transaction request based on a proximity of a location of the trading partner to the location of the requestor.

According to a third aspect of the present invention, a system for supporting a transaction between electronic device users is provided. The system comprises: (1) a request system for receiving a transaction request from a first electronic device possessed by a requester; (2) a location system for determining a location of the requestor based on the first electronic device; and (3) a matching system for identifying a trading partner to fulfill the transaction request based on a proximity of a location of the trading partner to the location of the requestor.

According to a fourth aspect of the present invention, a program product stored on a recordable medium for supporting a transaction between electronic device users is provided. When executed, the program product comprises: (1) program code for receiving a transaction request from a first electronic device possessed by a requestor; (2) program code for determining a location of the requestor based on the first electronic device; and (3) program code for identifying a trading partner to fulfill the transaction request based on a proximity of a location of the trading partner to the location of the requestor.

Therefore, the present invention provides a method, system and program product for supporting a transaction between electronic device users.

BRIEF DESCRIPTION OF THE DRAWINGS

These and other features of this invention will be more readily understood from the following detailed description of the various aspects of the invention taken in conjunction with the accompanying drawings in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the present invention provides a method, system and program product for supporting a transaction between electronic device users. Specifically, a transaction request is generated and transmitted to a transaction node from an electronic device (e.g., personal computer, wireless device, etc.) possessed by a requestor. To this extent, the transaction request can be manually generated and sent, or automatically generated and sent. In the case of the latter, the electronic device possessed by the requestor can be programmed to actively seek out other electronic devices possessed by potential trading partners within a certain physical proximity. If a potential trading partner is identified, the electronic device could then automatically generate and send the request to the transaction node. In any event, once the transaction request is received by the transaction node, the location of the requestor based on his/her electronic device is determined. The location can be determined by any method now known or later developed. Examples include global positioning system (GPS) technology, triangulation using cellular telephone signals, triangulation using television signals, etc. Once the location is determined, a trading partner will be identified to fulfill the request. The trading partner is identified based on his/her capability (readiness, willingness and ability) to fulfill the transaction request as well as the location of the trading partner. Specifically, a trading partner is selected based on his/her proximity to the location of the requestor. Thus, regardless of the location or mobility of the requester, the present invention identifies a suitable trading partner in physical proximity thereto.

Figure 1:
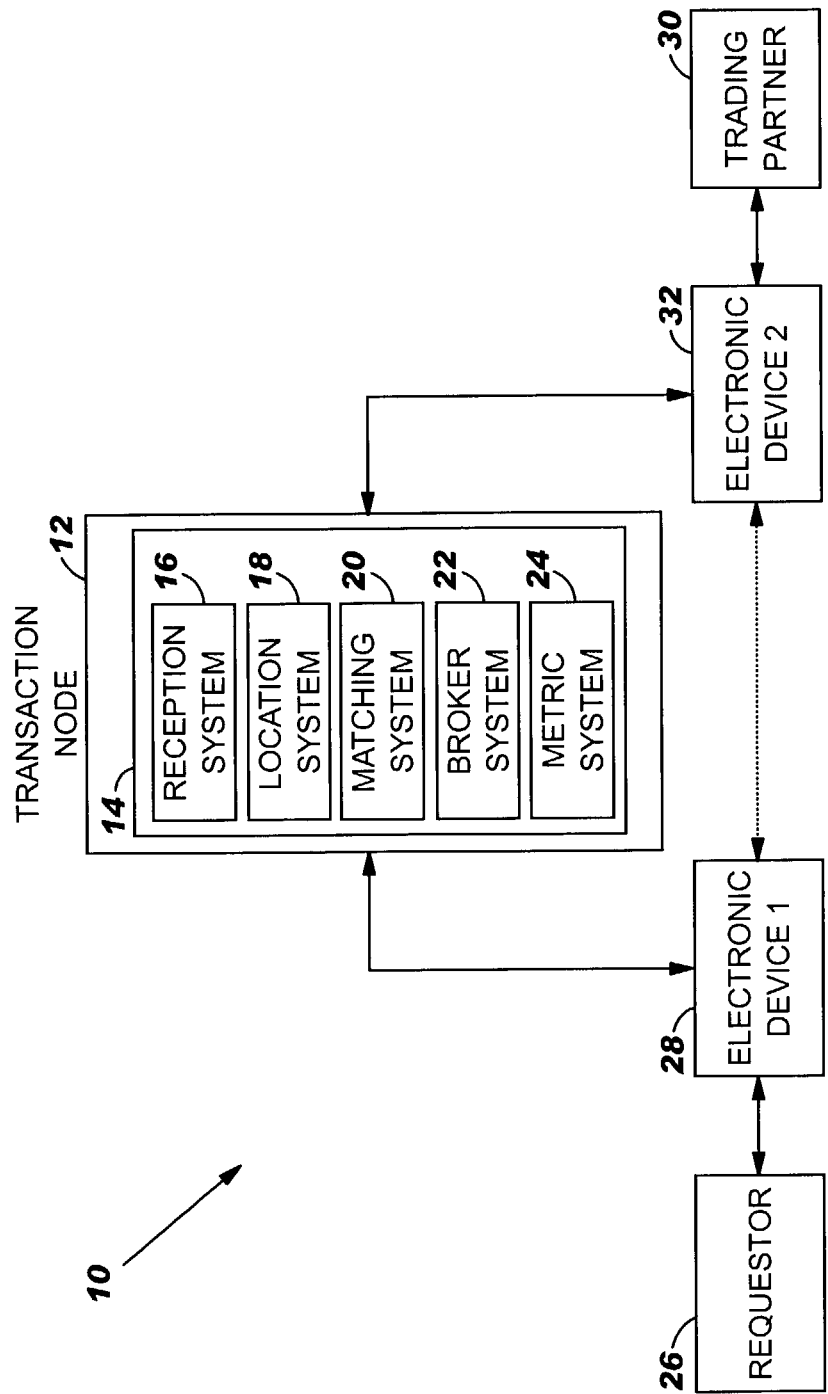
FIG. 1 depicts a block diagram of a system for supporting a transaction between electronic device users according to the present invention.

Referring now to FIG. 1, system 10 for supporting a transaction between wireless device users is shown. As depicted, system 10 includes transaction node 12 that communicates with electronic device 28 and electronic device 32. Under the present invention, transaction node 12 is intended to represent any type of computerized system that can communicate with other computerized systems (e.g., over a network). For example, transaction node 12 could be a server in a network such as a PCS server (i.e., in the event electronic devices 38 and 32 are mobile telephones). In addition, electronic devices 28 and 32 are intended to represent any type of computerized devices capable of communicating over a network. Examples include: (1) wireless device such as personal digital assistants, mobile telephones, pager devices, etc.; and (2) "hardwired" devices such as personal computers, laptops, workstations, etc. In the case of the former, the wireless devices 28 and 32 could communicate with transaction node 12 in accordance with the I.E.E.E. 802.11(b) standard for Wi-Fi networks. Alternatively, electronic devices 28 and 32 could communicate directly with each other in accordance with the Bluetooth standard.

It should be appreciated in advance that although the teachings of the present invention will be described in the exemplary context of requestor 26 selling a product and trading partner 30 buying the product, many variations could be implemented. For example, requestor 26 could be seeking to purchase goods or services and trading partner 30 could be seeking to sell. Moreover, the teachings of the present invention could be used to exchange information, as opposed to goods or services. For example, if requestor 26 is an employee of a company, and is in an airport during a layover, the transaction request could be a request to identify any fellow employees of the company that are also in the airport (e.g., for networking and/or social purposes). The primary teachings of the present invention are to allow electronic device users who are in proximity to each other, and that share a common interest, to be matched with each other.

Shown loaded on transaction node 12 is trading system 14, which includes reception system 16, location system 18, matching system 20, broker system 22 and metric system 24. Trading system 14 allows requestor 26 issuing a transaction request from electronic device 28 to be matched with trading partner 30 based on the physical proximity of trading partner 30 with respect to requestor 26, as well as the capability (i.e., readiness, willingness and ability) of trading partner 30 to fulfill the request. For example, if requestor is seeking to sell sporting tickets (i.e., in a legal fashion), requester 26 will issue a transaction request stating the same. To this extent, the transaction request could indicate the day and time of the game, the teams that are playing, the location of the game and the requested price. This transaction request will be generated on electronic device 28 via an interface (e.g., web browser) and received by reception system 16. As indicated above, the transaction request could be manually generated and sent by requester 26, or automatically generated and sent when electronic device 28 detects another electronic device (i.e., electronic device 32) in proximity thereto. In a typical embodiment, all communications with transaction node 12, such as transaction requests, will adopt a common taxonomy or language. The use of a common taxonomy prevent communication errors and confusion.

Once received, the transaction request can be stored by transaction node 12 in memory such as a database or the like. To fulfill requestor 26's transaction request, an appropriate trading partner must be identified. In general, an appropriate trading partner is one that is in physical proximity to requestor 26, and that is ready, willing and able to fulfill the transaction request (e.g., capable of buying the tickets). To this extent, the physical proximity of requestor 26 and trading partner 30 could be required to meet a predefined standard. For example, in the transaction request, requestor 26 could indicate that he/she wishes for potential buyers to be within 20 miles. Moreover, all electronic device users (e.g., requestors, trading partner, etc.) who wish to utilize trading system 14 could be made to register and establish a profile. The profile could indicate, among other things: (1) what goods, services and/or information each user desired to exchange (e.g., what tickets requester wishes to sell 26, what tickets trading partner 30 wishes to buy, etc.); (2) address information; (3) credit card information; and (4) proximity distance requirements (e.g., 20 miles). The user profiles could be securely stored in memory such that they are accessible by transaction node 12.

In any event, once the transaction request has been received, location system 18 will determine the physical location of requestor 26 based on electronic device 28. This determination can be based on any "location" technology now known or later developed. For example, electronic device 28 could include a GPS chip that allows for its location to be pinpointed using GPS technology. Alternatively, if electronic device 28 is a cellular telephone, a triangulation using cellular telephone signals could be made to determine the location of electronic device 28 and requestor 26. Still yet, if electronic device 28 utilizes television signals, a triangulation using television signals could be used to determine its location.

After the location of requester 26 has been determined, an appropriate trading partner will be identified. To this extent, matching system 20 will determine one or more users that are at a location in proximity to the location of requestor 26 (i.e., requestor 26's electronic device 28), and that are capable of fulfilling the transaction request (e.g., wishes to buy the tickets). In the example shown in FIG. 1, trading partner 30 is intended to represent a user who matches this criteria. That is, trading partner 30 is in close proximity to requestor 26 and is capable (i.e., ready willing and able) of purchasing the tickets.

It should be understood that in identifying trading partner 30, the determinations of user capability and user proximity could be performed in any order. Specifically, it is not important whether matching system 20 first determines what users are capable of fulfilling the transaction request, or what users are in proximity to requestor 26. For example, matching system 20 could first establish a set of users who are capable of fulfilling the transaction request, and then narrow the set based on proximity to requestor 26. Alternatively, matching system 20 could first determine what users are in proximity to requestor 26, and then narrow that set by determining which of those users has a common trading interest (i.e., is capable of fulfilling the request).

In determining what users are in proximity to requestor 26, the locations of other users are determined. Determining the location of the other users can be accomplished in a manner similar to determining the location of requester 26. For example, the locations of the users could be determined via GPS technology using a GPS chip within the users' respective electronic devices, a triangulation using cellular telephone signals, a triangulation using television signals, etc. Alternatively, the relative proximity of a user can be established simply by connection of the user and requestor 26 to a common node. For example, if electronic devices 38 and 32 are cellular telephones, matching system 20 could determine that trading partner 30 is at a location in proximity to the location of requestor 26 if they are connected to the same PCS server. In any event, a predefined proximity standard could be applied to ensure that the most appropriate user(s) is selected as trading partner 30. To this extent, the predefined standard could be any standard that sets some framework for a maximum preferred physical distance between requestor 26 and trading partner 30. For example, the predefined standard could be a specific distance limitation, a city limitation, etc. Alternatively, the predefined standard could be non-geographic such as connection of the parties to a common node, as described above. In any event, the predefined standards could be dictated by requester 26, or could be dictated in policies within transaction node 12.

In determining what users are capable of fulfilling the transaction, matching system 20 could search the stored profiles for users who are seeking what is being offered (e.g., a user wishing to buy the tickets being sold by requester 26). For example, trading partner 30 could have updated his/her profile that morning to reflect a desire to obtain specific sporting event tickets. Alternatively, transaction node 12 could maintain one or more lists of transaction request that are received (as mentioned above), and then compare the lists to find common interests. For example, just as transaction node 12 received a transaction request from requestor 26 seeking to sell tickets, transaction node 12 could have received a transaction request from trading partner 30 seeking to buy tickets (in which case trading partner 30 could also be considered a "requestor," and requestor 26 could also be considered a "trading partner"). By storing each transaction request received, and keeping one or more lists of what is available and what is sought, a simple comparison could reveal potential matches.

It should be appreciated that in the event that multiple potential trading partners are identified, the present invention could optionally narrow the set to fewer trading partners. For example, narrowing of the set could by accomplished based on closeness to requestor 26, pricing information, etc.

Once trading partner 30 has been identified, broker system 22 will foster the transaction. In one embodiment, broker system could forward to requestor 26 and/or trading partner 30 the contact information for each other (e.g., cellular telephone number, short messaging identification, etc.). This would allow the parties to communicate directly and complete the transaction. The benefit of allowing direct contact between requester 26 and trading partner 30 to occur is that technology such as short messaging can be utilized. As known in the art, a short message is an alphanumeric message that is sent between cellular telephone subscribers. The standard short message today comprises 160 characters, which can be extended by 50% if sent using data compression. Thus, the teachings of the present invention could be utilized to increase the use of short messaging and similar technologies.

Alternatively, all communications between requester 26 and trading partner 30 could pass through broker system 22. This would allow broker system 22 to more actively facilitate and broker the transaction. To this extent, transaction node 12 could contain predefined data such as transaction terms, items being offered, quantities, etc. that are accessible by broker system 22 and that would help complete the transaction. Regardless of whether requestor 26 and trading partner 30 communicate directly or via broker system 22, all communications with transaction node will likely adopt a common taxonomy or language (as indicated above).

Also shown in trading system 14 is metric system 24, which can store data pertaining to transactions occurring through transaction node 12. Specifically, metric system 24 could store data and create reports regarding what goods, services, or information are being exchanged, what users are using transaction node 12, how many matches are occurring, what geographic regions result in the most matches, etc. This will allow transaction node 12 administrators and users to see precisely what role transaction node 12 is playing in the exchange goods, services and/or information.

Figure 2:
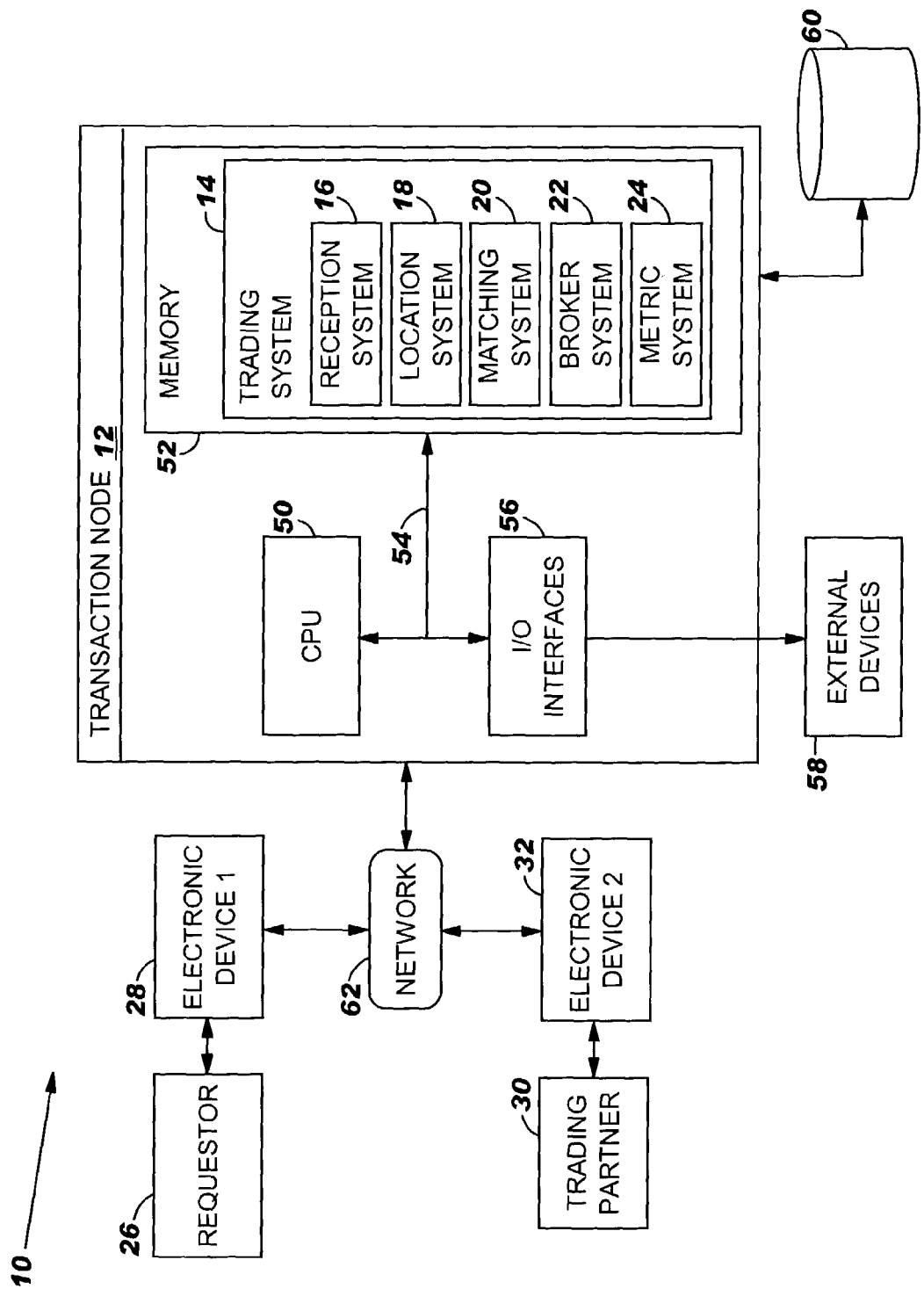
FIG. 2 depicts more detailed diagram of the system of FIG. 1.

Referring now to FIG. 2, a more detailed diagram of system 10 is shown. As depicted, transaction node 12 includes central processing unit (CPU) 50, memory 52, bus 54, input/output (I/O) interfaces 56 and external devices/resources 58. CPU 50 may comprise a single processing unit, or be distributed across one or more processing units in one or more locations, e.g., on a client and server. Memory 52 may comprise any known type of data storage and/or transmission media, including magnetic media, optical media, random access memory (RAM), read-only memory (ROM), a data cache, a data object, etc. Moreover, similar to CPU 50, memory 52 may reside at a single physical location, comprising one or more types of data storage, or be distributed across a plurality of physical systems in various forms.

I/O interfaces 56 may comprise any system for exchanging information to/from an external source. External devices/resources 58 may comprise any known type of external device, including speakers, a CRT, LED screen, hand-held device, keyboard, mouse, voice recognition system, speech output system, printer, monitor, facsimile, pager, etc. Bus 54 provides a communication link between each of the components in transaction node 12 and likewise may comprise any known type of transmission link, including electrical, optical, wireless, etc. In addition, although not shown, additional components, such as cache memory, communication systems, system software, etc., may be incorporated into transaction node 12.

Database 60 is optional and could provide storage for information under the present invention. Such information could include, for example, transaction requests, metric data, user profiles, lists, etc. As such, database 60 may include one or more storage devices, such as a magnetic disk drive or an optical disk drive. In another embodiment, database 60 includes data distributed across, for example, a local area network (LAN), wide area network (WAN) or a storage area network (SAN) (not shown). Database 60 may also be configured in such a way that one of ordinary skill in the art may interpret it to include one or more storage devices.

It should be understood that communication among transaction node 12, and electronic devices 28 and 32 can occur via a direct hardwired connection (e.g., serial port), or via an addressable connection in a client-server (or server-server) environment which may utilize any combination of wireline and/or wireless transmission methods. In the case of the latter, the server and clients may be connected via network 62 such as the Internet, a wide area network (WAN), a local area network (LAN), a virtual private network (VPN) or other private network. The server and clients may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the clients would utilize an Internet service provider to establish connectivity to the server. It should also be understood that although not shown for brevity purposes, electronic devices 28 and 32 can include computerized components (e.g., CPU, memory, database, etc.) similar to transaction node 12. In addition, it should be understood that electronic devices 28 and 32 can be hardwired devices such as a personal computer, or wireless devices such as a personal digital assistant. In the event of the latter, electronic devices 28 and 32 could communicate with transaction node 12 in accordance with the I.E.E.E. 802.11(b) standard.

Stored in memory 52 of transaction node 12 is trading system 14, which itself includes request system 16, location system 18, matching system 20, broker system 22 and metrics system 24. As described in detail above, requestor 26 will issue a transaction request (e.g., manually or automatically) proposing the exchange of goods, services and/or information via electronic device 28. The request can be routed to transaction node 12 over network and received by reception system 16. Upon receipt, any relevant data in the transaction request can be stored in database 60 for future purposes (e.g., matches, metrics, etc.). Location system 18 will then determine the location of requester 26 by determining the location of electronic device 28. As indicated above, this can be accomplished in any fashion now known or later developed such as GPS, cellular telephone signal triangulation, etc.

Once the location of requester 26 is known, matching system 20 will then identify trading partner 30 among other users of system 10. As indicated above, this involves determining what users are at a location in proximity to requester 26, and that are capable of fulfilling the transaction request (e.g., in any order). Location of other users can be determined using similar technology (e.g., GPS, cellular telephone signal triangulation, television signal triangulation, etc.). Proximity can be determined according to a predefined standards (e.g., geographic limitations, connection to a common node, etc.) The capability of other users to fulfill the transaction could be determined based on a search of user profiles, or by comparing the details of the transaction request to those of other transaction requests received (e.g., matching lists). In any event, once a match is established and trading partner 30 is identified, broker system 22 will help facilitate the transaction by either forwarding contact information to requester 26 an/or trading partner 30 so the parties can directly communicate, or by acting as an intermediary therebetween. As indicated above, as the transaction process is occurring, metrics system 24 can track all pertinent data pertaining to the transaction for future reference.

Figure 3:
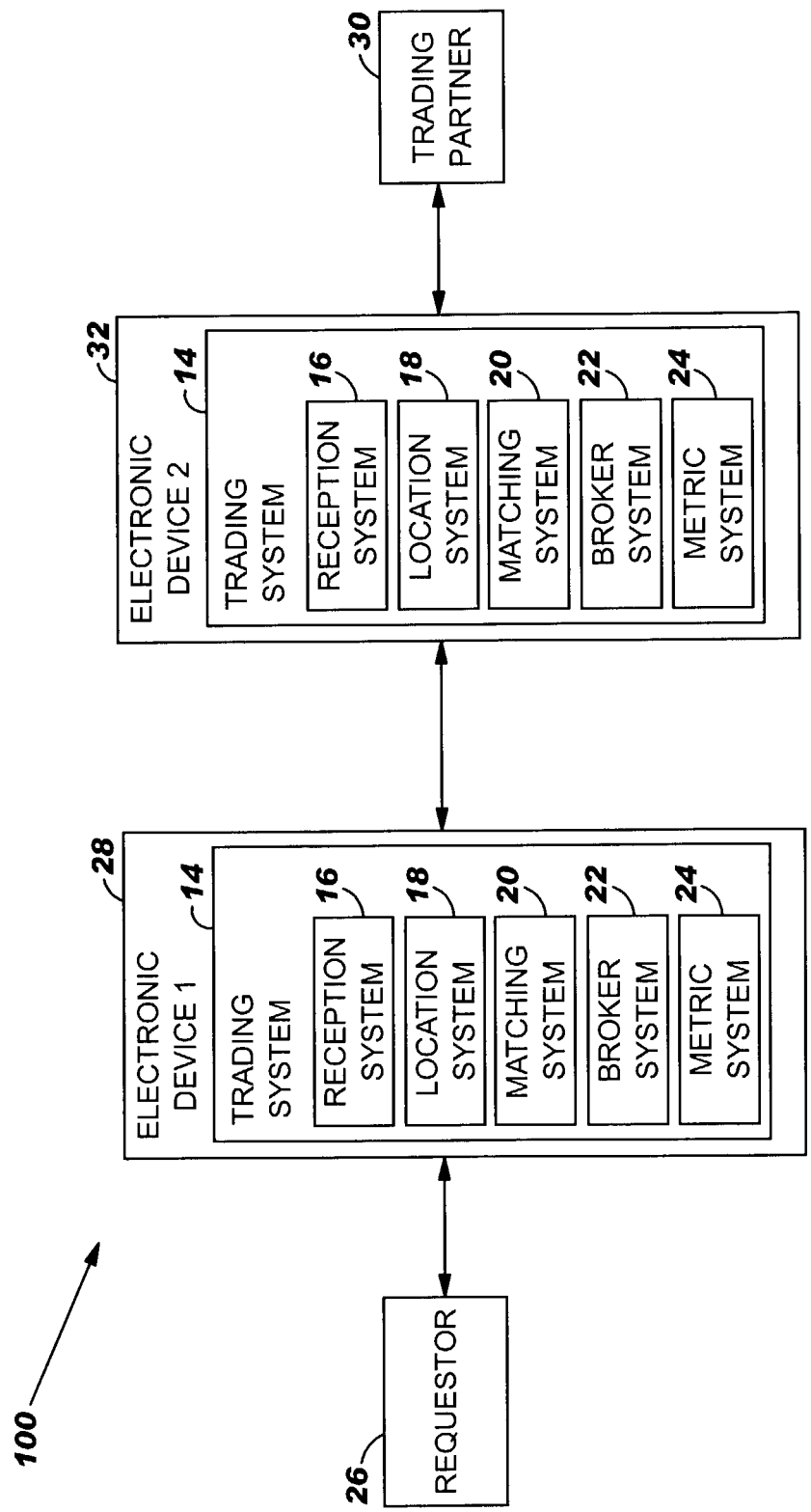
FIG. 3 depicts a system for support a transaction between electronic device users according to another aspect of the present invention.

Referring now to FIG. 3, system 100 according to another embodiment of the present invention is depicted. As shown, electronic devices 28 and 32 transact directly with each other, as opposed to through a transaction node or a server. As indicated above, one standard which provides for such operation is the Bluetooth standard, which is well known in the art. Under system 100 each electronic device 28 and 32 could include trading system 14 (or a similar variant thereof). This would allow transaction requests issued by requestor 26 and trading partner 30 to be processed locally instead of globally. For example, if requestor 26 wished to sell goods, he/she could first use location system 18 on electronic device 28 to determine if any other users are in close proximity. Such a determination could be performed manually (upon demand) by requester 26, or automatically. In the case of the latter, electronic device 28 could be programmed to actively seek out other electronic devices within a certain proximity (e.g., similar to system 10). In any event, location system 18 would first pinpoint the location of electronic device 28 (i.e., using any "location" technology now known or later developed), and then attempt to find other users in proximity to requestor 26 (i.e., according to a predefined standard such as a geographic limitation). Assuming trading partner 30 was found to be within proximity to requester 26, matching system 20 of electronic device 28 could then search the internal memory of electronic device 32 to determine if trading partner 30 was looking to purchase what requester is selling. As indicated above, each user could prepare one or more lists of what goods, services, and/or information he/she wishes to exchange. These lists could be stored in the internal memory of each electronic device 28 and 32. This memory could be searchable by other users.

Regardless of whether the memory is searched, a transaction request could be sent by requestor 26 and then received by reception system 16 of electronic device 32. Once received, broker system 22 of electronic device 32 could evaluate the transaction request to determine if it is truly something that trading partner 30 can fulfill (i.e., has trading partner 30 expressed an interest in purchasing what goods requestor 26 is selling). This could involve comparing the offered goods to the lists within the internal memory of electronic device 32. To complete the transaction, a series of "requests" could be automatically generated and sent via broker systems 22 of electronic devices 28 and 32. Alternatively, requestor 26 and trading partner could communicate manually, for example, cellular telephone, short messaging, etc. In any event, metric systems 24 could track all pertinent data related to the transaction for future reference.

It is understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls transaction node 12 and electronic devices 28 and 32 such that each carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed:

1. A computer-implemented method for supporting a transaction between electronic device users, comprising:
    receiving a transaction request from a first electronic mobile device; wherein the transaction request consists of a request to sell goods or services;
    determining a location of the first electronic device; and
    identifying a second mobile electronic device for receiving the transaction request based on a proximity of a location of the second electronic device to the location of the first electronic device, and based on a capability of a user of the second mobile electronic device to fulfill the transaction request by purchasing the goods or services, the identifying further comprising:
        comparing the location of the first electronic device to the location of the second electronic device; and
        selecting the second electronic device if the proximity of the location of the second electronic device to the location of the first electronic device meets a predetermined standard.

2. The method of claim 1, wherein the first electronic device and the second electronic device are selected from the group consisting of wireless devices and hardwired devices.

3. The method of claim 1, wherein the location of the first electronic device and the second electronic device are determined based on a global positioning system (GPS).

4. The method of claim 1, wherein the location of the first electronic device and the second electronic device are determined based on one of a triangulation using cellular telephone signals or a triangulation using television signals.

5. The method of claim 1, further comprising transmitting information to the first electronic device to fulfill the transaction request.

6. The method of claim 1, wherein the proximity is established based on a connection of the second electronic device and the first electronic device to a common node.

7. A computer-implemented method for supporting a transaction between electronic device users, comprising:
    receiving a transaction request from a first mobile electronic device possessed by a requestor; wherein the transaction request consists of a request from the requestor to sell goods or services;
    determining a location of the requestor based on the electronic device;
    identifying a trading partner with a second mobile electronic device to fulfill the transaction request based on a proximity of a location of the trading partner to the location of the requestor; and based on a capability of the trading partner to fulfill the transaction request by purchasing the goods or services, the identifying further comprising:
        comparing the location of the requestor to the location of the trading partner; and
        selecting the trading partner if the proximity of the locations meets a predetermined standard.

8. The method of claim 7, wherein the first electronic device is a first wireless device, wherein the trading partner operates a second wireless device, and wherein the location of the trading partner is based on the second wireless device.

9. The method of claim 7, further comprising transmitting information pertaining to the identified trading partner to the requestor.

10. The method of claim 7, wherein the locations of the requestor and the trading partner are determined based on a global positioning system (GPS).

11. The method of claim 7, wherein the location of the requestor and the trading partner are determined based on one of a triangulation using cellular telephone signals or a triangulation using television signals.

12. The method of claim 7, wherein proximity is established based on a connection of the trading partner and the requestor to a common node.

13. A system for supporting a transaction between electronic device users, comprising:
    a request system for receiving a transaction request from a first electronic mobile electronic device possessed by a requestor; wherein the transaction request consists of a request from the requestor to sell goods or services;
    a location system for determining a location of the requestor based on the first electronic device;
    a matching system for identifying a trading partner with a second mobile electronic device to fulfill the transaction request based on a proximity of a location of the trading partner to the location of the requestor; and based on a capability of the trading partner to fulfill the transaction request by purchasing the goods or services, the identifying further comprising:
        comparing the location of the requestor to the location of the trading partner; and
        selecting the trading partner if the proximity of the locations meets a predetermined standard.

14. The system of claim 13, wherein the first electronic device is a first wireless device, wherein the trading partner operates a second wireless device, and wherein the location of the trading partner is based on the second wireless device.

15. The system of claim 13, further comprising a broker system for communicating information to support the transaction.

16. The system of claim 13, further comprising a metric system for tracking statistics for the transaction.

17. The system of claim 13, wherein the location of the requestor is determined based on a GPS analysis of the electronic device.

18. The system of claim 13, wherein the location of the requestor is determined by one of a triangulation using cellular telephone signals or a triangulation using television signals.

19. The system of claim 13, wherein the matching system identifies the trading partner by applying a predetermined standard to the proximity of the locations of the requestor and the trading partner.

* * * * *